US008126435B2

(12) United States Patent
George

(10) Patent No.: US 8,126,435 B2
(45) Date of Patent: Feb. 28, 2012

(54) TECHNIQUES TO MANAGE VEHICLE COMMUNICATIONS

(75) Inventor: Moses George, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 12/130,333

(22) Filed: May 30, 2008

(65) Prior Publication Data

US 2009/0298474 A1 Dec. 3, 2009

(51) Int. Cl.
    H04M 3/42 (2006.01)
(52) U.S. Cl. ............... 455/412.2; 709/206; 704/260
(58) Field of Classification Search ........... 455/412.2; 717/166; 709/206; 704/260
    See application file for complete search history.

(56) References Cited

U.S. PATENT DOCUMENTS

2002/0193996 A1* 12/2002 Squibbs et al. ............... 704/260
2006/0130033 A1*  6/2006 Stoffels et al. ............... 717/166

* cited by examiner

Primary Examiner — Phuoc Doan

(57) ABSTRACT

Techniques to manage vehicle communications are described. A mobile computing device may include a communication module operative to establish a first communication channel with a message server, and a second communication channel with a vehicle system, a message application module communicatively coupled to the communication module, the message application module operative to receive a user message over the first communication channel, and send an event message over the second communication channel, and a vehicle message application module communicatively coupled to the message application module, the vehicle message application module operative to receive a read control directive over the second communication channel, convert text information from the user message to mail audio information, and send the mail audio information over the second communication channel. Other embodiments are described and claimed.

24 Claims, 5 Drawing Sheets

320

- ESTABLISH A COMMUNICATION CHANNEL WITH A MOBILE COMPUTING DEVICE
  322

- RECEIVE EVENT AUDIO INFORMATION OVER THE COMMUNICATION CHANNEL
  324

- REPRODUCE THE EVENT AUDIO INFORMATION USING AN OUTPUT DEVICE
  326

- RECEIVE A READ CONTROL DIRECTIVE FROM AN INPUT DEVICE
  328

- SEND THE READ CONTROL DIRECTIVE OVER THE COMMUNICATION CHANNEL
  330

- RECEIVE MAIL AUDIO INFORMATION OVER THE COMMUNICATION CHANNEL
  332

- REPRODUCE THE MAIL AUDIO INFORMATION USING THE OUTPUT DEVICE
  334

*FIG. 3B*

TECHNIQUES TO MANAGE VEHICLE COMMUNICATIONS

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

In some cases, certain electronic devices might not have the computing and/or communications resources typically available to a smart phone. Such electronic devices may occasionally utilize the computing and/or communications resources offered by a smart phone by pairing with the smart phone utilizing an appropriate communications protocol, such as a wireless personal area network (WPAN) communications protocol. It is with respect to these and other considerations that some enhancements have been developed.

BRIEF DESCRIPTION OF THE DRAWINGS

FIG. 3B illustrates one embodiment of a second logic diagram.

DETAILED DESCRIPTION

Figure 1:
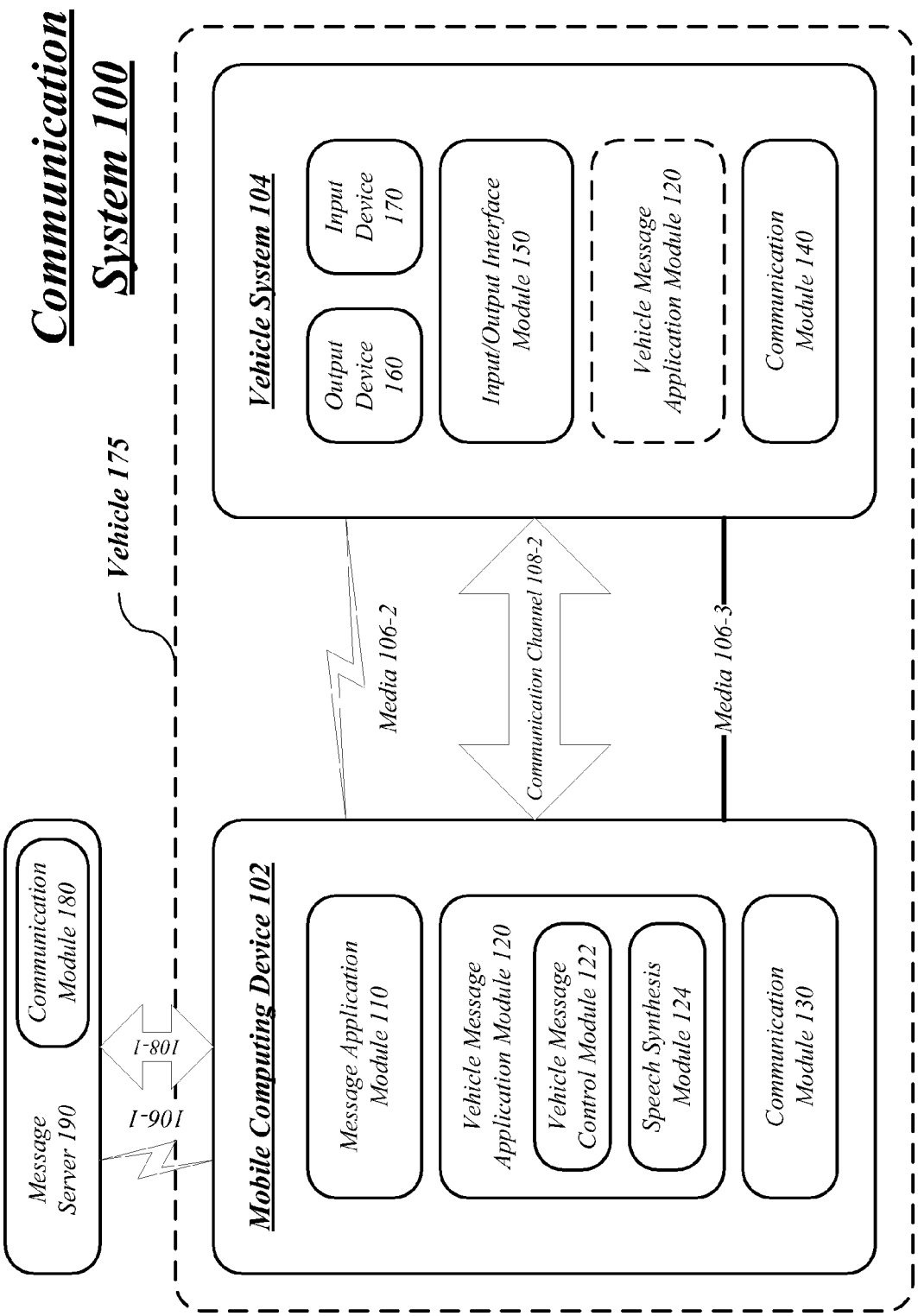
FIG. 1 illustrates one embodiment of a communications system.

Various embodiments may be generally directed to enhanced techniques to manage vehicle communications using a mobile computing device, such as a smart phone. Some embodiments may be particularly directed to techniques for controlling a message application implemented by a mobile computing device utilizing control directives received by a vehicle system. In one embodiment, for example, the message application may comprise an email message application, the control directives may comprise voice commands, and the vehicle system may comprise a vehicle computing device. The embodiments, however, are not limited to these examples.

The enhanced vehicle communications techniques may provide several advantages over conventional techniques. When driving in a vehicle, for example, it is typically unsafe for a user to check email on a mobile computing device such as a smart phone. Furthermore, a vehicle may not have a vehicle computing device with sufficient computing or communications resources needed to execute a message application, such as an electronic mail ("email") application.

To reduce or avoid these and other issues, a smart phone may be designed to interoperate with a vehicle system, such as a media system or navigation system, to announce the user of the new messages received by the smart phone via the vehicle device. A driver can choose to listen to the new messages utilizing a user interface and various input devices (e.g., buttons for manual commands, microphone for voice commands, etc.) implemented for the vehicle system, and the smart phone can read out the new messages to the user over various output devices implemented for the vehicle system (e.g., a speaker, electronic display, etc.). In this manner, the user does not have to actually handle the smart phone while driving, thereby reducing safety issues and increasing user convenience.

The enhanced vehicle communications techniques may establish a wireless PAN (WPAN) between the smart phone and the vehicle system utilizing a common PAN protocol. In one embodiment, for example, the common PAN protocol may comprise the Bluetooth protocol as defined by the Institute of Electrical and Electronics Engineering (IEEE) organization, such as IEEE 802.15.x series of protocols, variants and progeny ("Bluetooth Standard"). The smart phone may utilize a hands-free profile designed in accordance with the Bluetooth Standard to establish the WPAN with the vehicle system. Furthermore, the smart phone may utilize "in-band ringing" techniques to notify a user of new messages. In-band ringing refers to the capability of using audio files from the smart phone to be used a ringtone over the vehicle system when an incoming telephone call is received. Applying the in-band ringing feature to messaging applications, when a new message arrives at the smart phone, the smart phone streams audio information over to the vehicle system to announce the new message arrival. This is perceived as an incoming call by the vehicle system, and hence the user can choose to read the new message using the same set of buttons (or other interface tools) on the vehicle system. For example, to listen to the new message, a user can press an "accept call" button on the vehicle system. The smart phone can utilize a text-to-speech (TTS) technique to synthesize text information from the new message to audio information, and stream the audio information to the vehicle system for reproduction using a vehicle speaker. Similarly, the smart phone can utilize a speech-to-text (STT) technique to convert audio information to text information to control a message application implemented by the smart phone or vehicle system, or respond to the new message using common messaging features (e.g., reply, forward, delete, file, etc.).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus that may communicate across different types of wireless links. In particular, FIG. 1 shows a communications system 100 comprising various representative elements, including a mobile computing device 102 capable of communicating via communications media 106-1-$n$ with a vehicle system 104 and a message server 190. The mobile computing device 102 may include by way of example and not limitation a message application module 110, a vehicle message application module 120, and a communication module 130. The vehicle message application module 120 may further comprise a vehicle message control module 122 and a speech synthesis module 124. The vehicle system 104 may include by way of example and not limitation a communication module 140, an optional vehicle message application module 120, an input/output (I/O) interface module 150, one or more output devices 160, and one or more input devices 170. The communications media 106-1-$n$ may include a wireless communications media 106-1 and/or a wired communications media 106-2 and suitable interfaces. These elements or portions of these elements may be implemented in hardware, software, firmware, or in any combination thereof. The embodiments are not limited to these depicted elements.

In various embodiments, some or all of the elements of the illustrated embodiment shown in FIG. 1 may be implemented using a processing system comprising, in a basic form, a processor and memory. The processor may comprise a general purpose processor or an application specific processor arranged to provide general or specific computing capabilities for the communications system 100. For example, the processor may perform operations associated with higher layer protocols and applications. For instance, the processor may be implemented as a host processor to provide various user applications, such as telephony, text messaging, e-mail, web browsing, word processing, video signal display, and so forth. In addition, the processor may provide one or more functional utilities that are available to various protocols, operations, and/or applications. Examples of such utilities include operating systems, device drivers, user interface functionality, and so forth. In some cases, the processor may be implemented as a radio processor to provide various communications operations, such as baseband processing, protocol processing, and so forth. The memory may comprise computer-readable media such as volatile or non-volatile memory units arranged to store programs and data for execution by the processor. The memory may store various modules in the form of executable program instructions, code or data. The processor may retrieve and execute the program instructions, code or data from the memory to control or provide enhanced vehicle communication operations for the mobile computing device 102.

The mobile computing device 102 may be generally configured to support or provide cellular voice communication, wireless data communication and computing capabilities. The mobile computing device 102 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 102 implemented as a smart phone by way of example, it may be appreciated that the embodiments are not limited in this context. For example, the mobile computing device 102 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The vehicle system 104 may be generally configured to support wireless data communication and computing capabilities for a vehicle 175. The vehicle system 104 may further provide various input devices and output devices. Examples of input devices may include buttons, displays, microphones, keypads, keyboards, pointing devices, and so forth. Example of output devices may include speakers, displays, vibrators, and so forth. Examples of vehicle system 104 may include without limitation media systems, entertainment systems, navigation systems, vehicle computing systems, and so forth. In some cases, the vehicle system 104 may be integrated with the vehicle, such as an audio system having microphones and speakers integrated into the existing framework of the vehicle. In other cases, the vehicle system 104 may be a separate electronic device arranged for temporary or permanent attachment to the vehicle interior, and may include integrated input devices and/or output devices.

In one use scenario, the mobile computing device 102 and the vehicle system 104 may be used internally to the vehicle 175. The mobility feature of the mobile computing device 102 allows a user to transport the mobile computing device 102 to different geographical locations, including within the interior of the vehicle 175. Once within the interior of the vehicle 175, if the user owns both the mobile computing device 102 and the vehicle 175, the mobile computing device 102 and the vehicle system 104 may operate as trusted devices and automatically establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The communication channel is typically a secure communication channel to prevent snooping from unauthorized parties, although in some cases an unsecure communication channel may be used as well.

This arrangement allows the mobile computing device 102 and the vehicle system 104 to interoperate to provide various communication services, such as hands-free communication for telephone calls. In such cases, the mobile computing device 102 provides the telephony capabilities by establishing and managing the call channel, while the vehicle system 104 provides the hands-free communication capabilities by reproducing audio information from the remote user with the vehicle speakers, and accepting audio information from the local user with the vehicle microphone.

The message server 190 may comprise a network device such as a server providing messaging services for the mobile computing device 102. The message services may include without limitation email services, chat, short message service (SMS), multimedia message service (MMS), facsimile service, voice service, video service, and so forth. The message server 190 may be implemented to provide a limited set of discrete messaging services, or may provide integrated messaging services such as unified messaging (UM) services. UM services integrate different streams of communication into a single or unified message store accessible from a variety of devices. In this case, the message server 190 may be implemented as part of a fully integrated unified communications system.

In various embodiments, the mobile computing device 102, the vehicle system 104 and the message server 190 may implement various communication technologies to communicate media information and control information between each other. In one embodiment, for example, the elements 102, 104, 190 may implement respective communication modules 130, 140, 180. The communication modules 130, 140, 180 may comprise various wired or wireless communication elements. The wireless communication elements may comprise various radio elements, including a radio processor, one or more transceivers, amplifiers, filters, switches, and so forth. The communication modules 130, 140, 180 may communicate with remote devices across different types of wireless links utilizing various communications techniques.

Since the mobile computing device 102 and the message server 190 are typically geographically disparate, the communication modules 130, 180 may implement different types of longer range wireless systems. For example, the communication modules 130, 180 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The communication modules 130, 180 may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

The communication modules 130, 180 may additionally or alternatively communicate across various non-cellular communications links. The communication modules 130, 180 may be arranged to provide voice and/or data communications functionality in accordance with different types of wireless network systems or protocols. Examples of suitable wireless network systems offering data communication services may include the IEEE 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Since the mobile computing device 102 and the vehicle system 104 are typically geographically proximate (e.g., within a vehicle cabin), the communication modules 130, 140 may utilize different types of shorter range wireless systems. For example, the communication modules 130, 140 may be implemented as Bluetooth devices operating in accordance with the Bluetooth Standards such as the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices. Similar to the communication modules 130, 180, the communication modules 130, 140 may also implement various mid-range wireless systems, such as offered by the IEEE 802.xx series of protocols.

It may be appreciated that the communication modules 130, 140, 180 may utilize different communications elements (e.g., radio processors, transceivers, etc.) to implement different communications techniques. Furthermore, the communication modules 130, 140, 180 may support multiple communications techniques by implementing multiple sets of corresponding radio equipment. For example, the communication module 130 may support GSM communications using a first transceiver, IEEE 802.xx (e.g., 802.11) communications using a second transceiver, Bluetooth communications using a third transceiver, and so forth. The embodiments are not limited in this context.

In general operation, the mobile computing device 102 may be operative to establish various communication channels with the message server 190 via the communication modules 130, 180. In one embodiment, for example, the communication module 130 may be operative to establish a first communication channel 108-1 with the communication module 180 of the message server 190 over the wireless media 106-1. The communication module 130 may be operative to establish a second communication channel 108-2 with the vehicle system 104 over the wireless media 106-2. In one embodiment, the first communication channel 108-1 may be established over a wireless local area network (WLAN) or wireless wide area network (WWAN), and the second communication channel 108-2 may be established over a WPAN. For example, the WLAN may comprise an IEEE 802.11x network, the WWAN network may comprise a cellular radiotelephone system network, and the WPAN may comprise a Bluetooth network. In the latter case, the WPAN Bluetooth network may be established using a Bluetooth hands-free profile commonly used to establish short range wireless networks between a mobile device and a vehicle car kit.

The mobile computing device 102 may include the message application module 110 communicatively coupled to the communication module 130. As shown in FIG. 1, the mobile computing device 102 may comprise or implement one or more messaging application modules 110 arranged to communicate various types of messages in a variety of formats. Each of the messaging application modules 110 may be representative of a particular kind of transport, enabling handling of messages of particular types and formats for the particular application. The messaging application modules 110 may comprise, for example, a telephone application 111, a voice-mail application 112, a facsimile application 113, a video teleconferencing application 114, an IM application 115, an email application 116, an SMS application 117, and an MMS application 118. It is to be understood that the embodiments are not limited in this regard and that the messaging application modules 110 may include any other type of messaging or communications application which is consistent with the described embodiments. It also is to be appreciated that the mobile computing device 102 may implement other types of applications in addition to the messaging application modules 110 which are consistent with the described embodiments.

Figure 4:
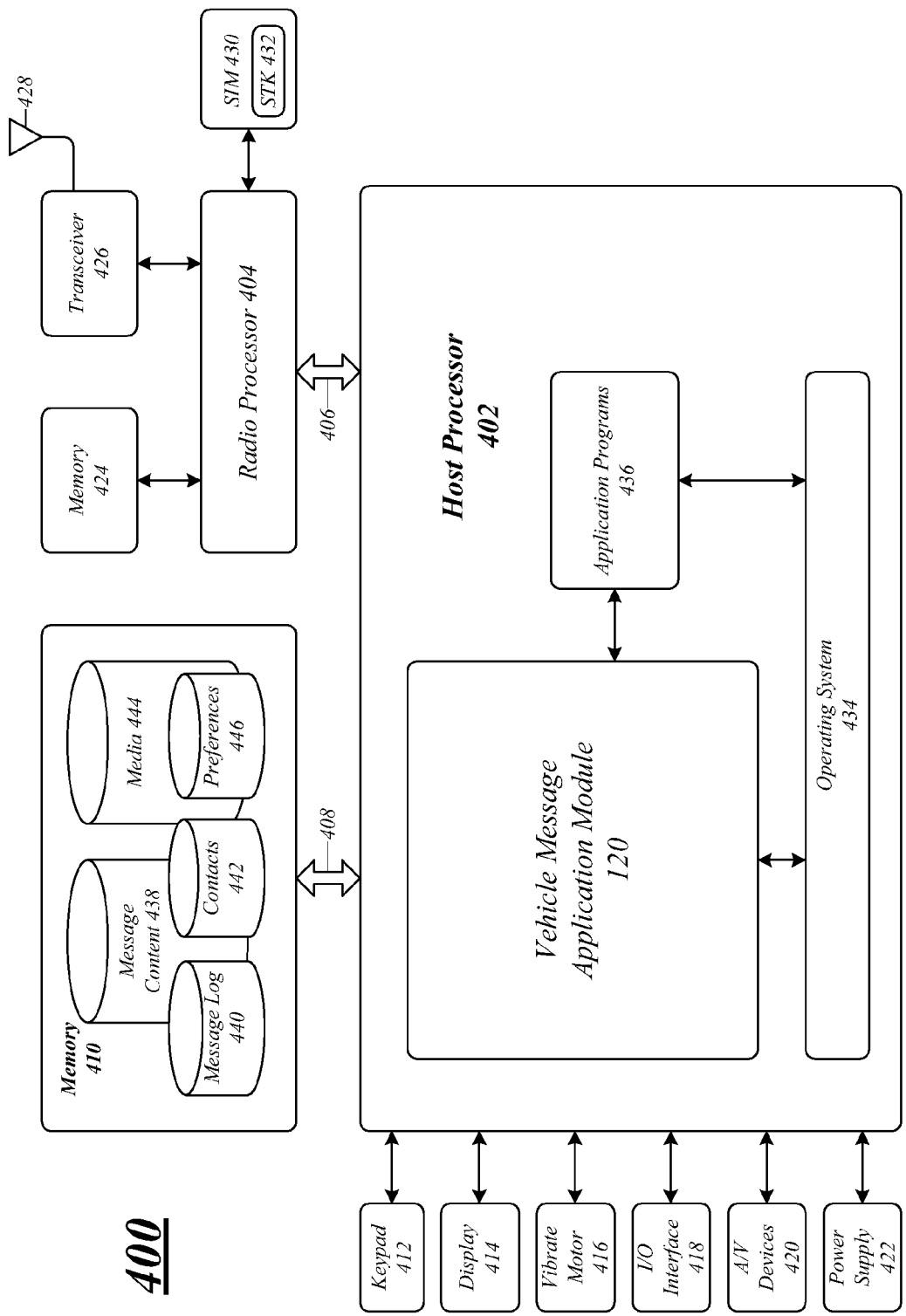
FIG. 4 illustrates one embodiment of a second mobile computing device.

The mobile computing device 102 may comprise a message content database 438 as shown in FIG. 4. The message content database 438 may be arranged to store content and attachments (e.g., media objects) of messages sent and received by the messaging application modules 110. The message content database 438 may be implemented as part of one or more memory units for the mobile computing device 102, for example.

The message application module 110 may be generally operative to communicate messages between the mobile computing device 102 and the message server 190, and between the mobile computing device 102 and the vehicle system 104 via the vehicle message application module 120. In this respect, the message application module 110 and/or the vehicle message application module 120 operate as a two-way or bi-directional communication channel between the vehicle system 104 and the message server 190.

In one embodiment, the message application module 110 receives a user message over the first communication channel 108-1, and sends an event message over the second communication channel 108-2. A user message may refer to a message sent to a user of the mobile computing device 102 via the message server 190. The user message may comprise, for example, an email message sent from another corresponding message application used by another user. The message application module 110 may receive the user message, and process the user message per normal message handling rules. In addition, the message application module 110 may notify the vehicle message application module 120 of the new incoming user message to determine whether to route the new incoming user message to the vehicle system 104. This may be accomplished by generating and sending a suitable event message notifying the vehicle system 104 of the new incoming user message over the second communication channel 108-2.

The mobile computing device 102 may include the vehicle message application module 120 communicatively coupled to the message application module 110. The vehicle message application module 120 may be operative to receive various control directives from the vehicle system 104 over the second communication channel 108-2. The control directives may be received by one or more input devices 170 from a user, and sent to the mobile computing device 102 via the second communication channel 108-2. For example, the control directives may comprise voice commands converted to text information or other suitable control messages and/or signals to control operations for the message application module 110 and/or the vehicle message application module 120.

In one embodiment, the vehicle message application module 120 may be operative to receive a read control directive over the second communication channel 108-2. For instance, once the vehicle system 104 receives the event message from the vehicle message application module 120, the vehicle system 104 may relay a read control directive from a user to read the new incoming user message. The vehicle message application module 120 may synthesize or convert text information from the new incoming user message to mail audio information, and send the mail audio information over the second communication channel 108-2 to the vehicle system 104.

The vehicle system 104 may include the I/O interface module 150 communicatively coupled to the communication module 140. The I/O interface module 150 may be operative to receive event audio information and audibly reproduce the event audio information using the output device 160. The I/O interface module 150 may receive a read control directive from the user via the input device 170. For example, the user may listen to the event audio information, and determine to read the new incoming user message. The user may enter a read control directive either manually through various input buttons presented by a user interface for the vehicle system 104, or through voice commands via a microphone. The I/O interface module 150 may receive the control directive, and send the read control directive over the second communication channel 108-2 to the mobile computing device 102.

In response to the read control directive, the vehicle message application module 120 may synthesize or convert text information from the new incoming user message to mail audio information, and send the mail audio information over the second communication channel 108-2 to the vehicle system 104. The vehicle system 104 may receive the mail audio information over the second communication channel 108-2, and audibly reproduce the mail audio information utilizing the I/O interface module 150 and a suitable output device 160, such as a vehicle speaker.

Although legacy vehicle systems typically include limited computing capabilities and therefore operate as conduits for signal paths between the mobile computing device 102 and the I/O devices 160, 170, for those vehicle systems having enhanced computing capabilities such as vehicle computing devices, some of the features and operations performed by the mobile computing device 102 may be distributed or moved completely to the vehicle system 104. In such cases, the vehicle system 104 may optionally include a vehicle message application module 120 communicatively coupled to the communication module 140 and the I/O interface module 150. In addition to the same features and operations performed by the vehicle message application module 120 when implemented by the mobile computing device 102, the vehicle message application module 120 as implemented by the vehicle system 104 may be operative to navigate a message interface to the message application module 110 in response to voice commands received from the input device 170. In this case, the TTS and/or STT operations may be performed by the vehicle system 104, and the resulting output signals communicated over the second communications channel 108-2 for interpretation and subsequent processing by the message application module 110. This may be advantageous, for example, when the vehicle system 104 provides superior computing capabilities than the mobile computing device 102, thereby enhancing speed and efficiency when operating the message application module 110. This may also be advantageous to conserve battery life for the mobile computing device 102 when an external power supply is unavailable (e.g., using a vehicle charger).

Figure 2:
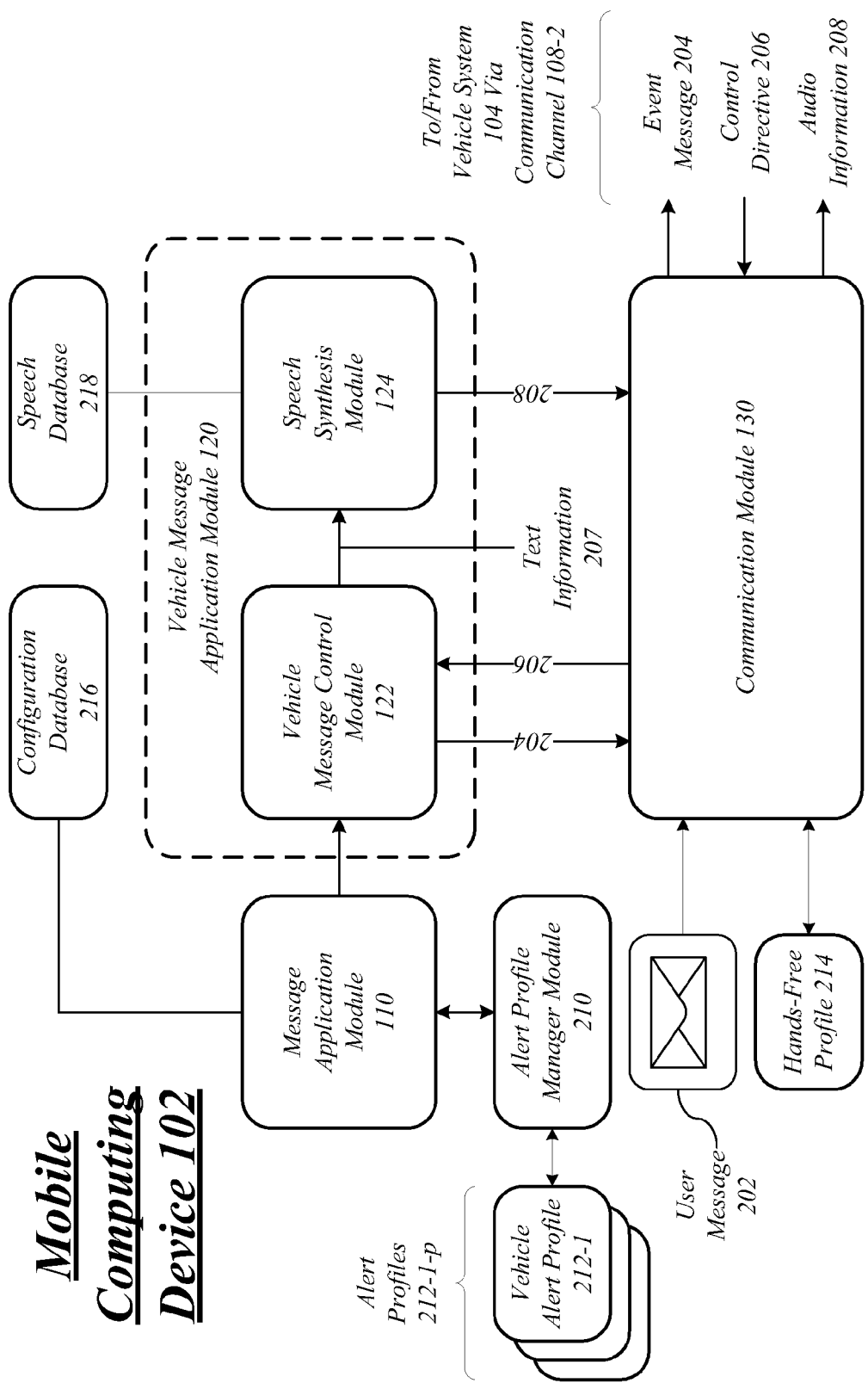
FIG. 2 illustrates one embodiment of first mobile computing device.

FIG. 2 illustrates a more detailed block diagram for the mobile computing device 102. As shown in the illustrated embodiment of FIG. 2, the communication module 130 receives a user message 202. The user message 202 may be sent by the message server 190 or an alternate device, such as a peer mobile computing device. The communication module 130 forwards the user message 202 to the message application module 110 for processing. The message application module 110 receives the user message 202, and handles the user message 202 in accordance with a set of message handling rules as defined by the configuration parameters stored by a configuration database 216. For example, the message application module 110 can place the user message 102 in a message inbox, perform filtering operations based on sender or subject line, send user notifications for a new message, automatically forward the message to another device, and so forth. One of the message handling rules may indicate that the user message 202 is a type of user message that is suitable for forwarding to the vehicle system 104.

The mobile computing device 102 may include an alert profile manager module 210 communicatively coupled to the message application module 110. The alert profile manager module 210 may be operative to retrieve one or more alert profiles 212-1-*p* corresponding to a message type for the user message 202. The alert profiles 212-1-*p* may comprise a set of alert parameters or rules for alerting a user to the arrival of a particular message. For example, an alert parameter may include playing a particular audio file for a selected ringtone, setting a volume level for the audio file, causing an output device such as a vibrator motor to vibrate the mobile computing device 102, illuminating a set of light emitting diodes (LEDs) in a certain sequence, and so forth. Different alert profiles 212-1-*p* may be created for any number of reasons, such as different message types, different senders, different receivers, different communication modes, different operating environments, and so forth. The different alert profiles 212-1-*p* may be indexed by any suitable type of metadata for search and retrieval operations. One of the alert profiles 212-1-*p* may comprise a vehicle alert profile 212-1 designed to handle incoming user messages suitable for reproduction by the vehicle system 104.

Whenever the message application module 110 receives the user message 202, the message application module 110 may determine a message type associated with the user message 202 (e.g., an email message), and send the message type to the alert profile manager module 210. The alert profile manager module 210 may retrieve an alert profile 212-1-*p* corresponding to the message type, and forward various control directives and internal event messages consistent with the alert profile 212-1-*p*. For example, whenever the message application module 110 receives the user message 202 comprising an email message, the message application module 110 may notify the alert profile manager module 210 to retrieve the vehicle alert profile 212-1. The vehicle alert profile 212-1 may include vehicle alert parameters and rules to process the user message 202, such as forwarding the user message 202 to the vehicle message application module 120 for further message processing operations, among others.

As depicted in FIG. 2, the vehicle message application module 120 may comprise a vehicle message control module 122. The vehicle message control module 122 may be generally operative to control message processing operations for those messages accessible by the vehicle system 104.

In one embodiment, the vehicle message control module 122 may be notified of the user message 202 received by the message application module 110. The vehicle message control module 122 may send an event message 204 to the vehicle system 104 via the communication module 130. In one embodiment, the event message 204 may sent as event audio information identified by the vehicle alert profile 212-1. The event audio information may represent audio information corresponding to a particular event. For example, an event may comprise receiving a message of a given type (e.g., an email message), and the event audio information may comprise an audio file with audio information (e.g., a particular ringtone). The alert profile manager module 210 may retrieve the target audio file, and cause a media playback application (not shown) to begin reproducing the audio information from the audio file as an audio stream. The audio stream may be communicated to the vehicle system 104 over the communication channel 108-2 for reproduction by the output device 160 (e.g., a vehicle speaker).

In one embodiment, the vehicle message control module 122 may cause the mobile computing device 102 to notify a user of the user message 202 via the vehicle system 104 by mimicking or emulating an incoming call request for a telephone call session. The mobile computing device 102 may utilize different "in-band ringing" techniques to notify a user of incoming call requests. In-band ringing refers to the capability of using audio files from the smart phone to be used a ringtone over the vehicle system when an incoming telephone call is received. For instance, once the mobile computing device 102 and the vehicle system 104 are paired to form the communication channel 108-2, the mobile computing device 102 may receive an incoming telephone call. The alert profile manager module 210 may retrieve an audio file for a given ringtone, and begin streaming the ringtone over the communication channel 108-2 to the output device 160 of the vehicle system 104. In this case, the communication channel 108-2 operates as a call signaling channel to set-up or establish a telephone call between various endpoints. The user hears the ringtone, and determines whether to answer the incoming call request by manual or voice commands received by the input device 170. If the user indicates acceptance of the incoming call request, the mobile computing device 102 is informed accordingly and a call session is established between the endpoints. The endpoints may begin communicating media information, such as voice information, over the communication channel 108-2. In this case, the communication channel 108-2 operates as a call media channel.

Similarly, the vehicle message control module 122 may utilize such in-band ringing techniques to notify a user of the user message 202. Applying the in-band ringing feature to the vehicle message control module 122, when the user message 202 arrives at the message application module 110, the alert profile manager module 210 streams audio information over the communication channel 108-2 to the vehicle system 104 to announce the arrival of the new user message 202. This is perceived as an incoming call by the vehicle system 104, and hence the user can choose to read the new user message 202 using the same user interface tools of the vehicle system 104 typically used for handling telephone calls. For example, to listen to the new message, a user can press an "accept call" button on the vehicle system 104. In this manner, the in-band ringing technique may seamlessly integrate the features offered by the vehicle message application module 120 with existing legacy vehicle systems implemented for the vehicle 175.

As depicted in FIG. 2, the vehicle message application module 120 may comprise a vehicle message control module 122 communicatively coupled to a speech synthesis module 124. The speech synthesis module 124 may be generally operative to perform TTS operations and STT operations for control information and media information used by the message application module 110.

The speech synthesis module 124 may implement various speech synthesis techniques to artificially produce or synthesize human speech. A computer system used for this purpose is called a speech synthesizer, and can be implemented in software or hardware. A TTS system converts normal language text into speech, while other systems render symbolic linguistic representations like phonetic transcriptions into speech. Synthesized speech can be created by concatenating pieces of recorded speech that are stored in a speech database 218. Systems differ in the size of the stored speech units; a system that stores phones or diphones provides the largest output range, but may lack clarity. For specific usage domains, the storage of entire words or sentences allows for high-quality output. Alternatively, the speech synthesis module 124 can incorporate a model of the vocal tract and other human voice characteristics to create a completely "synthetic" voice output.

The speech synthesis module 124 comprises two parts including a front-end processor and a back-end processor. The front-end processor converts raw text containing symbols like numbers and abbreviations into the equivalent of written-out words. This process is often called text normalization, pre-processing, or tokenization. The front-end processor then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end processor. The back-end processor is often referred to as the synthesizer, and converts the symbolic linguistic representation into sound.

The speech synthesis module 124 may be operative to convert text information for the user message 202 to mail audio information representing machine synthesized speech. The user message 202 may include various forms of media information, including text information 107. After the vehicle message control module 122 sends the event message 204 to the vehicle system 104 to notify a user of the new user message 202, the user may respond with a manual command or voice command to read the user message 202. The vehicle system 104 may send a read control directive 206 over the second communication channel 108-2. The vehicle message control module 122 may receive the read control directive 206, and send the text information 107 from the user message 202 to the speech synthesis module 124.

The speech synthesis module 124 may receive the text information 107 from the vehicle message control module 122, and convert the text information 107 to mail audio information 208. The speech synthesis module 124 may send the mail audio information 208 to the vehicle system 104 over the communication channel 108-2 via the communication module 130. The vehicle system 104 may reproduce the mail audio information 208 as audible speech via the I/O interface module 150 and the output device 160.

In addition to synthesizing the text information 107 into human speech, the speech synthesis module 124 may also synthesize or convert other media information or media objects from the user message 202 into human speech or speech equivalents. For example, if the user message 202 includes a media object such as an image, and the image has associated metadata, the speech synthesis module 124 may convert the metadata to human speech. Similarly, if the user message 202 has attachments such as files, the speech synthesis module 124 may synthesize the file names to human speech. Other techniques may be used to convert media information or objects into audio information suitable for a user.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3A:
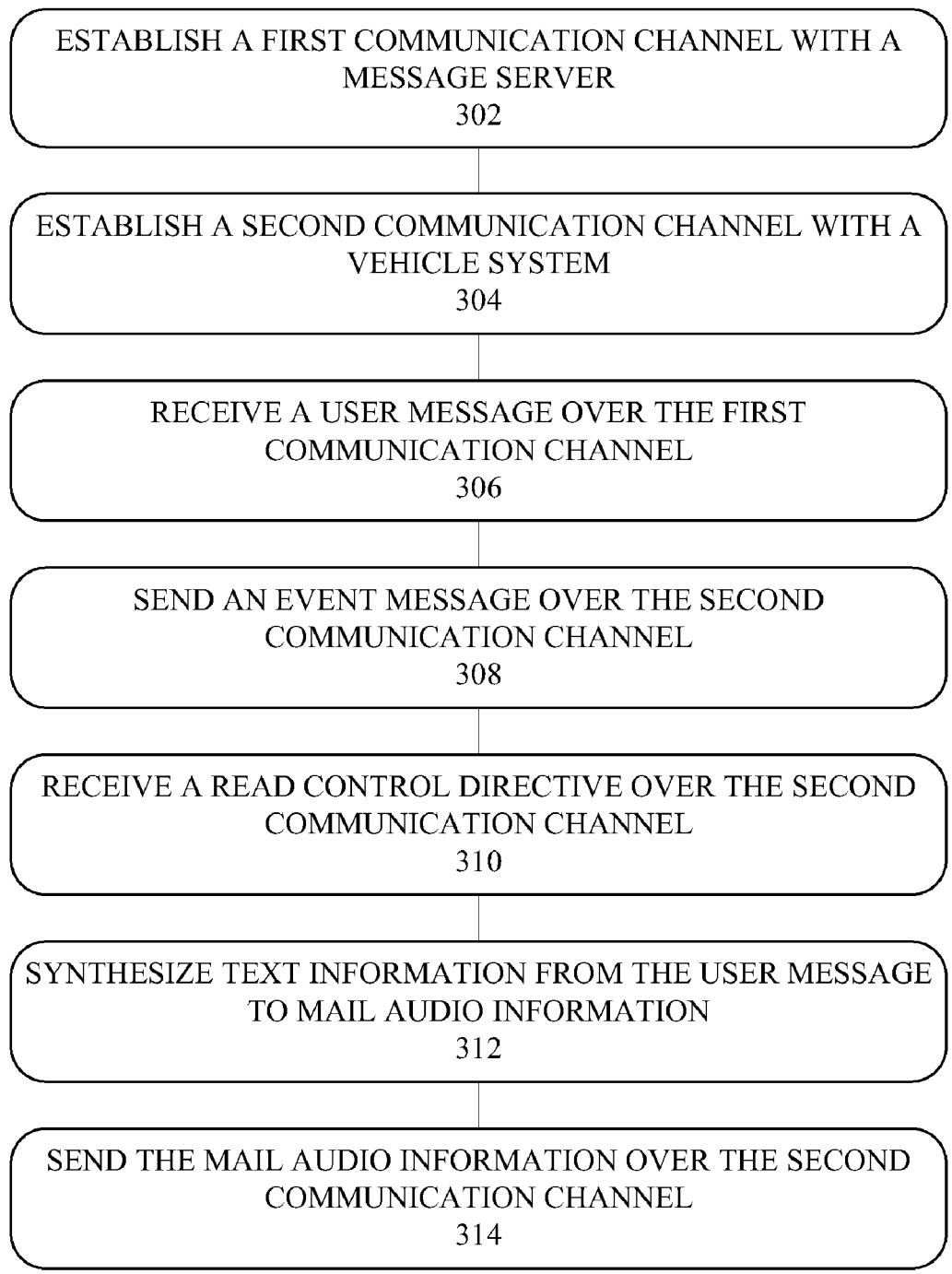
FIG. 3A illustrates one embodiment of a first logic diagram.

FIG. 3A illustrates one embodiment of a logic diagram 300. In particular, the logic diagram 300 may be representative of the operations executed by one or more embodiments described herein, such as the mobile computing device 102.

As shown in the FIG. 3A, the logic diagram 300 may establish a first communication channel with a message server at block 302. For example, the communications module 130 of the mobile computing device 102 may establish the first communication channel 108-1 with the message server 190 via the wireless media 106-1. The first communication channel 108-1 may be established, for example, over a WWAN system (e.g., a cellular radiotelephone system, WiMAX system, etc.), a WLAN system (e.g., a WiFi system), or other longer range communication systems.

The logic diagram 300 may establish a second communication channel with a vehicle system at block 304. For example, the communications module 130 may establish a second communication channel 108-2 with the vehicle system 104 via the wireless media 106-2 or the wired media 106-3. The second communication channel 108-2 may be established, for example, over a WPAN system such as a Bluetooth system, IEEE 1394 FireWire system, infra-red system, or other shorter range communication systems.

The logic diagram 300 may receive a user message over the first communication channel at block 306. For example, the communication module 130 may receive the user message 202 over the first communication channel 108-1 from the message server 190. The message server 190 may provide any type of messaging service, and in one embodiment, provides a UM service. The user message 202 represents any type of message, including an email message, chat message, group chat message, SMS message, MMS message, voice message, video message, media message, and so forth.

The logic diagram 300 may send an event message over the second communication channel at block 308. For example, the message application module 110 may notify the vehicle message control module 122 of the vehicle message application module 120 of the arrival of the user message 202 which is suitable for reproduction using the vehicle system 104. The vehicle message control module 122 may generate and send the event message 204 over the second communication channel 108-2 to the vehicle system 104.

The logic diagram 300 may receive a read control directive over the second communication channel at block 310. For example, the input device 170 of the vehicle system 104 may receive a user command in the form the read control directive 206, and the I/O interface module 150 may forward the read control directive 206 to the mobile computing device 110 via the communication modules 130, 140. The vehicle message control module 122 may receive the read control directive 206 from the communication module 130.

The logic diagram 300 may synthesize text information from the user message to mail audio information at block 312. For example, the vehicle message control module 122 may notify the speech synthesis module 124 of a read request for the user message 202, and forward the text information 207 from the user message 202 to the speech synthesis module 124. Additionally or alternatively, the speech synthesis module 124 may retrieve the text information 207 directly from the user message 202. The speech synthesis module 124 may use the speech database 218 to convert the text information 207 to mail audio information 208 representing machine synthesized speech.

The logic diagram 300 may send the audio information over the second communication channel at block 314. For example, the speech synthesis module 124 may send the mail audio information 208 over the second communication channel 108-2 to the vehicle system 104.

FIG. 3B illustrates one embodiment of a logic diagram 320. In particular, the logic diagram 320 may be representative of the operations executed by one or more embodiments described herein, such as the vehicle system 104.

As shown in FIG. 3B, the logic diagram 300 may establish a communication channel with a mobile computing device at block 322. For example, the communication module 140 of the vehicle system 104 may establish the second communication channel 108-2 with the mobile computing device 102.

The logic diagram 300 may receive event audio information over the communication channel at block 324. For example, the communication module 140 may receive the event message 204 in the form of event audio information over the second communication channel 108-2.

The logic diagram 300 may reproduce the event audio information using an output device at block 326. For example, the communication module 140 may forward the event audio information to the I/O interface module 150, which reproduces the event audio information as humanly audible signals using the output device 160. The output device 160 may comprise, for example, vehicle speakers integrated into the interior of the vehicle cabin or in the vehicle system 104.

The logic diagram 300 may receive a read control directive from an input device at block 328. For example, the input device 170 of the vehicle system 104 may receive a user command in the form the read control directive 206 from the input device 170. The read control directive 206 may be generated in response to manual inputs by the user or through voice commands using input buttons or a microphone, respectively, as the input device 170.

The logic diagram 300 may send the read control directive over the communication channel at block 330. For example, the I/O interface module 150 may forward the read control directive 206 to the mobile computing device 110 via the communication modules 130, 140. The vehicle message control module 122 may receive the read control directive 206 from the communication module 130.

The logic diagram 300 may receive mail audio information over the communication channel at block 332. For example, the vehicle message control module 122 may receive the read control directive 206 from the communication module 130, and the speech synthesis module 124 may output the mail audio information 208 to the communication module 130 for transport to the vehicle system 104 via the second communication channel 108-2. The communication module 140 may receive the mail audio information 208, and forward it to the I/O interface module 150.

The logic diagram 300 may reproduce the mail audio information using the output device at block 334. For example, the I/O interface module 150 may receive the mail audio information 208, and reproduce the mail audio information 208 using the output device 160, such as vehicle speaker.

As previously described, in some embodiments the vehicle system 104 may also implement some or all of the features and operations of the vehicle message application module 120. In this case, the vehicle system 104 may convert speech information to control directives for the message application module 110 implemented by the mobile computing device 102 using the STT features of the speech synthesis module 124 implemented by the vehicle system 104. This may conserve computational or power resources for the mobile computing device 102, along with other advantageous.

Regardless of whether the message application module 110 and/or the vehicle message control module 120 is implemented as part of the mobile computing device 102, the vehicle system 104, or another device separate from the mobile computing device 102 or the vehicle system 104, the vehicle message application module 120 may be used to navigate a message interface for the message application module 110 implemented by the mobile computing device 102 (or the vehicle system 104) in response to voice commands received from the input device 170 and sent over the second communications channel 108-2. This may enhance the convenience and accessibility of the message application module 110 through the vehicle system 104 whenever a user is within the interior cabin of the vehicle 175. Examples of the voice commands representing control directives to navigate a message interface for the message application module 110 implemented by the mobile computing device 102 may include without limitation reading a message, creating a message, deleting a message, modifying a message, sending a message, forwarding a message, replying to a message, opening an attachment, reading an attachment, storing an attachment, forwarding an attachment, and so forth. The embodiments are not limited in this context.

By way of example, assume a user may desire to send a response to the incoming user message 202 or compose a new email message. The user may speak various voice commands such as "compose mail" or "respond to mail" or "forward mail" to initiate the corresponding email operations using the message application module 110. The vehicle message application module 120 may receive the spoken commands via the input device 170, and convert the spoken commands into the appropriate message control directives, and forward to the mobile computing device 102 over the communication channel 108-2 for processing by the message application module 110. Additionally or alternative, the vehicle message application module 120 and/or the I/O interface module 150 may send captured voice signals directly to the mobile computing device 102 over the communication channel 108-2, and the speech synthesis module 124 of the vehicle message application module 120 implemented by the mobile computing device 102 may interpret the voice commands and convert into the appropriate message control directive.

Once the message application module 110 receives the given message control directive, and processes the user message 202 (or a new user message) accordingly, the message application module 110 may notify the user using a similar notification technique previously described. The user may then begin composing content for an email message through dictation using spoken human language, which is captured by the input device 170 and converted to text using various common STT techniques. The STT techniques may be implemented by the vehicle system 104, the mobile computing device 102, or both. The message application module 110 may receive the content for the email message, and process accordingly using conventional email handling techniques. In this manner, a user may be able to control, navigate and utilize the message operations provided by the message application module 110 entirely using natural human speech, thereby facilitating hands-free email operations when operating the vehicle 175.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 (e.g., similar to the radio processor 124) may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (ANV) devices 420 that support AnV capability of the mobile computing device 400. Examples of AnV devices 420 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. The OS 434 and the application programs 436 may be the same or similar to the application module 114 described with reference to FIG. 1. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include the vehicle message application module 120. The vehicle message application module 120 may the same or similar to the vehicle message application module 120 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a communication module operative to establish a first communication channel with a message server, and a second communication channel with a vehicle system;
a message application module communicatively coupled to the communication module, the message application module operative to receive a user message over the first communication channel, and send an event message over the second communication channel; and
a vehicle message application module communicatively coupled to the message application module, the vehicle message application module operative to receive a read control directive over the second communication channel, convert text information from the user message to mail audio information, and send the mail audio information over the second communication channel.

2. The mobile computing device of claim 1, the communication module operative to establish the first communication channel over a wireless local area network or a wireless wide area network, and the second communication channel over a wireless personal area network.

3. The mobile computing device of claim 1, the communication module operative to establish the second communication channel with the vehicle system using a hands-free profile.

4. The mobile computing device of claim 1, the message application module operative to receive the user message as an email message, a short message service message or a multimedia message service message.

5. The mobile computing device of claim 1, comprising an alert profile manager module communicatively coupled to the message application module, the alert profile manager module operative to retrieve an alert profile corresponding to a message type for the user message.

6. The mobile computing device of claim 1, the vehicle message application module comprising a vehicle message control module communicatively coupled to a speech synthesis module, the vehicle message control module operative to send the event message as event audio information representing a ringtone from an alert profile, and the speech synthesis module operative to convert text information for the user message to the mail audio information representing machine synthesized speech.

7. The mobile computing device of claim 1, the communication module operative to send the event message as event audio information representing a ringtone from an alert profile over a telephone call signal channel, and the mail audio information representing machine synthesized speech over a telephone call media channel.

8. A vehicle system, comprising:
a communication module operative to establish a communication channel with a mobile computing device;
an input/output interface module communicatively coupled to the communication module, the input/output interface module operative to receive event audio information and audibly reproduce the event audio information using an output device;
the input/output interface module operative to receive a read control directive from an input device, and send the read control directive over the communication channel; and
the communication module operative to receive mail audio information, and the input/output interface module operative to audibly reproduce the mail audio information using the output device.

9. The vehicle system of claim 8, comprising a vehicle message application module communicatively coupled to the communication module and the input/output interface module, the vehicle message application module operative to navigate a message interface in response to voice commands received from the input device.

10. A method, comprising:
establishing a first communication channel with a message server;
establishing a second communication channel with a vehicle system;
receiving a user message over the first communication channel;
sending an event message over the second communication channel;
receiving a read control directive over the second communication channel;
synthesizing text information from the user message to mail audio information; and
sending the mail audio information over the second communication channel.

11. The method of claim 10, comprising establishing the first communication channel over a wireless local area network or a wireless wide area network.

12. The method of claim 10, comprising establishing the second communication channel over a wireless personal area network.

13. The method of claim 10, comprising establishing the second communication channel with the vehicle system using a hands-free profile.

14. The method of claim 10, comprising receiving the user message as an email message, a short message service message or a multimedia message service message.

15. The method of claim 10, comprising sending the event message as event audio information over a telephone call signal channel.

16. The method of claim 10, comprising sending the event message as event audio information representing a ringtone from an alert profile.

17. The method of claim 10, comprising retrieving an alert profile corresponding to a message type for the user message.

18. The method of claim 10, comprising synthesizing text information of the user message to the mail audio information representing machine synthesized speech.

19. The method of claim 10, comprising sending the mail audio information over a telephone call media channel.

20. An article comprising a computer-readable storage medium containing instructions that if executed enable a system to:
establish a first communication channel with a message server;
establish a second communication channel with a vehicle system;
receive a user message over the first communication channel;
send an event message over the second communication channel;
receive a read control directive over the second communication channel;
synthesize text information of the user message to mail audio information; and
send the audio information over the second communication channel.

21. The article of claim 20, further comprising instructions to establish the first communication channel over a wireless local area network or a wireless wide area network, and the second communication channel over a wireless personal area network.

22. The article of claim 20, further comprising instructions to establish the second communication channel with the vehicle system using a hands-free profile.

23. The article of claim 20, further comprising instructions to receive the user message as an email message, a short message service message or a multimedia message service message.

24. The article of claim 20, further comprising instructions to send the event message as event audio information representing ringtone from an alert profile over a telephone call signal channel, and the mail audio information representing machine synthesized speech over a telephone call media channel.

* * * * *